March 25, 1958 D. E. HOSMER 2,828,144
TRAILER HITCH ASSEMBLY
Filed Jan. 28, 1954 2 Sheets-Sheet 2
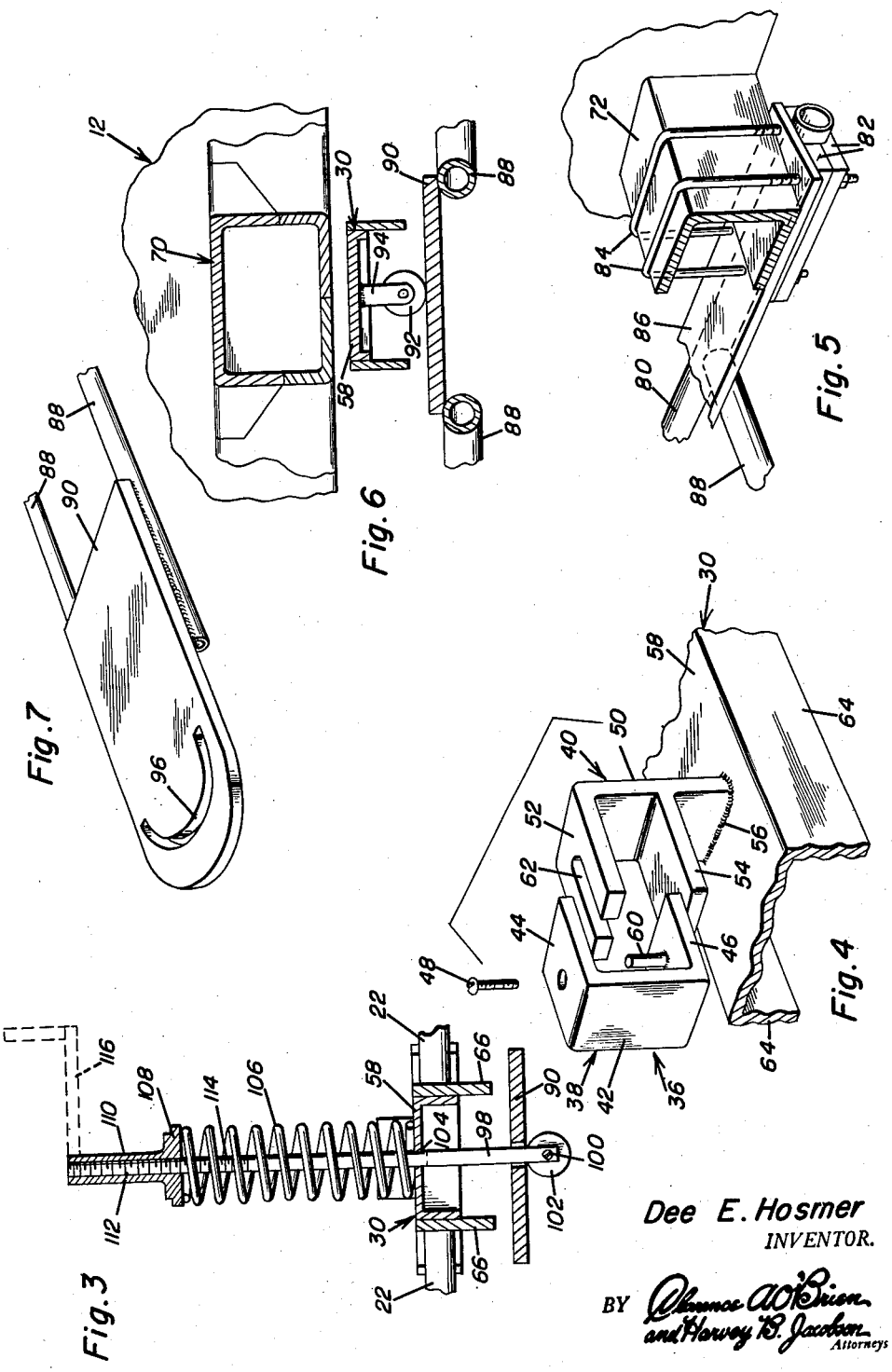
Dee E. Hosmer
INVENTOR.

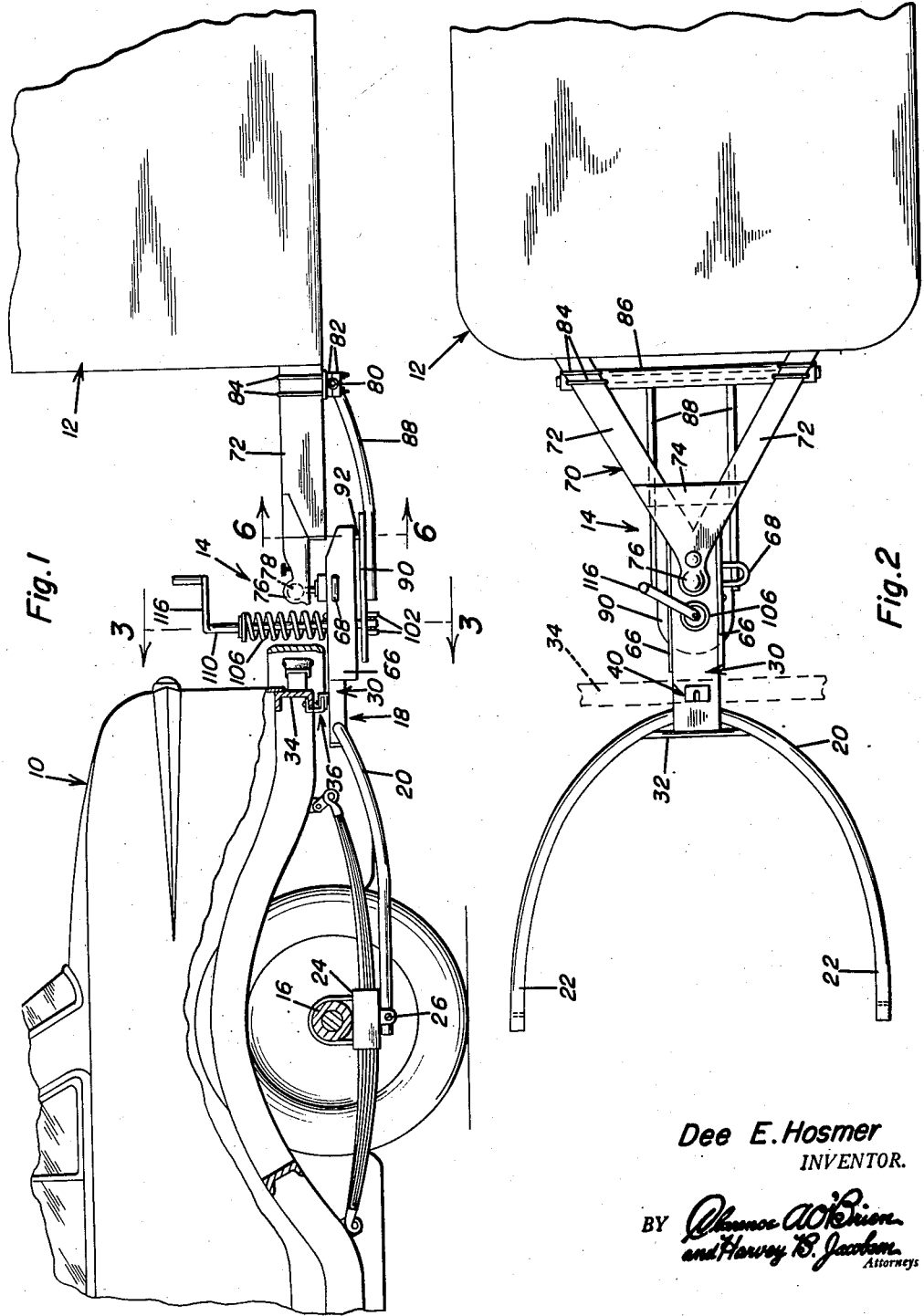

United States Patent Office 2,828,144
Patented Mar. 25, 1958

2,828,144

TRAILER HITCH ASSEMBLY

Dee E. Hosmer, Farmington, Mich.; Albert M. Nichols, trustee in bankruptcy, assignor to Joseph W. Taylor, Borough of Irwin, Westmoreland County, Pa.

Application January 28, 1954, Serial No. 406,804

7 Claims. (Cl. 280—483)

This invention relates in general to improvements in hitch assemblies, and more specifically to a hitch assembly between a towing vehicle and a trailer of the type wherein a portion of the weight of the trailer is partially carried by the towing vehicle.

A primary object of this invention is to provide an improved hitch assembly which is of such a nature whereby a trailer may be conveniently towed behind a towing vehicle without materially affecting the roadability and riding comfort of the towing vehicle and at the same time presenting a relatively rigid and effective connection between the towing vehicle and the trailer.

Another object of this invention is to provide an improved hitch assembly for trailers, the hitch assembly including a towing member which is so secured to the towing vehicle whereby the pulling force and a major portion of the weight imposed on the hitch assembly is directly applied to the rear axle housing of the vehicle in order that road shocks on the hitch assembly will not be applied to the frame of the towing vehicle to cause rideability of the towing vehicle to be decreased.

Another object of this invention is to provide a relatively rigid connection between a towing member and a tow pole of a trailer and at the same time providing a connection which is resilient to permit the relative movement of the tow pole with respect to the tow member when the towing vehicle and trailer are moving over uneven ground.

A further object of this invention is to provide an improved connection between a tow member and rear cross frame member of a towing vehicle, the connection permitting longitudinal movement of the tow member with respect to the frame of the vehicle to permit springing of the vehicle body relative to the wheel assembly therefor and at the same time transmitting all transverse twisting forces directly to the frame of the vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary side elevational view of a rear portion of a towing vehicle and a forward portion of a trailer and shows the general arrangement of the hitch assembly therebetween, a portion of the towing vehicle being broken away and shown in section in order to clearly illustrate the manner in which the hitch assembly is connected thereto;

Figure 2 is a top plan view of the hitch assembly of Figure 1, the towing vehicle being omitted and only the transverse rear cross frame member being illustrated, the rear cross frame member being shown in fragmentation by dotted lines;

Figure 3 is an enlarged fragmentary transverse vertical sectional view taken substantially upon the plane indicated by the section line 3—3 of Figure 1 and shows the manner in which the tow pole assembly of the trailer is resiliently mounted with respect to the tow member of the towing vehicle;

Figure 4 is an enlarged fragmentary exploded prespective view showing the details of the fastening means for connecting the tow member to the rear cross frame member of the towing vehicle;

Figure 5 is an enlarged fragmentary perspective view of the rear portion of the tow pole of the trailer which shows the manner in which arms are pivotally mounted thereon;

Figure 6 is an enlarged fragmentary transfer vertical sectional view taken substantially upon the plane indicated by the section line 6—6 of Figure 1 and shows the relationship between the tow pole assembly of the trailer and the rear portion of the tow member of the towing vehicle; and Figure 7 is an enlarged fragmentary perspective view of a supporting plate of the tow pole assembly.

Referring now to Figure 1 in particular, it will be seen that there is illustrated a towing vehicle which is referred to in general by the reference numeral 10. Connected to the towing vehicle and towed thereby is a trailer which is referred to in general by the reference numeral 12. The trailer 12 is connected to the towing vehicle 10 by a hitch assembly, which is the subject of this invention, which is referred to in general by the reference numeral 14.

In order that pulling forces may be applied directly from the rear axle assembly 16 of the towing vehicle 10, there is provided as a part of the hitch assembly 14 a tow member which is referred to in general by the reference numeral 18. The tow member 18 includes a U-shaped portion 20 which has a pair of forwardly extending, transversely spaced legs 22. The legs 22 are pivotally attached to spring mounting assemblies 24 of the towing vehicle 10 for pivotal movement through the use of pivot pins 26 which extend transversely through the legs 22, the pivot pins 26 being in alignment.

The tow member 18 also includes a longitudinally extending bar 30 which is channel shaped in cross section and which is secured to the rear part of the U-shaped portion 20. The bar 30 extends slightly forwardly of the rear part of the U-shaped portion 20 and is braced relative thereto by a transversely extending brace 32. The bar 30 is connected to a rear cross frame member 34 of the towing vehicle 10 by fastening means which are referred to in general by the reference numeral 36.

As is best illustrated in Figure 4, the fastening means 36 includes a C-shaped upper bracket 38 and an F-shaped lower bracket 40. The C-shaped upper bracket includes a vertical web 42, an upper flange 44 and a lower flange 46. The upper flange 44 is suitably secured to the rear cross frame member 34 by fasteners such as the bolt 48 in the manner best illustrated in Figure 1.

The F-shaped bracket 40 includes a vertically extending stem 50 which terminates at its upper end in a forwardly directed upper flange 52. Formed integral with the stem 50 and extending forwardly therefrom intermediate its ends in spaced parallel relation to the upper flange 52 is a lower flange 54. The lower end of the stem 50 is rigidly secured to the bar 30 by suitable fastening means such as welding 56, the bracket 40 being connected to the horizontal web 58 of the bar 30.

In order that no longitudinal forces may be transmitter from the bar 30 to the frame of the towing vehicle 10 and at the same time so that the frame of the towing vehicle 10 may carry a portion of an excessive vertical thrust imposed upon the bar and to support the bar 30 when a trailer is not being towed, the lower flange 46 of the bracket 38 is disposed between the upper flange 52 and the lower flange 54 of the bracket 50. It is to be understood that the flange 52 normally lies between the flanges 44 and 46 and transmits no loads thereto. Due to the overlapping areas of the flanges 52 and 46, the frame of the towing vehicle 10 may shift longitudinally relative to the bar 30 in the normal springing thereof relative to the rear axle assembly 16.

In order that undue transverse twisting action may not be imposed upon the pivot pins 26, the flange 46 is provided with an upstanding pin 60. The pin 60 is positioned in a longitudinally extending slot 62 in the flange 52. The pin 60 prevents any transverse movement of the mounting bracket 40 with respect to the mounting bracket 38 so as to prevent transverse movement of the bar 30.

The channel shaped bar 30 also includes a pair of spaced parallel depending flanges 64. The rear portions of the flanges 64 are reinforced, as best illustrated in Figure 3, by longitudinally extending, vertically disposed plates 66. Also, as is best illustrated in Figure 2, one of the plates 66 is provided with a U-shaped eye forming member 68. The eye forming member 68 is intended to have connected thereto a safety chain (not shown) carried by the trailer 12.

The trailer 12 is provided with a generally A-shaped tow pole which is preferred to in general by the reference numeral 70. The tow pole 70 includes a pair of forwardly converging legs 72 which are connected together at their forward ends. The legs 72 are braced intermediate their forward ends by a transverse brace 74. The extreme forward end of the tow pole 70 is provided with a hitch socket 76 which is removably received over a hitch ball 78 carried by the bar 30.

Carried by the legs 72 immediately adjacent the forward portion of the main part of the trailer 12 is a transverse bar 80. The bar 80 is pivotally journaled in a pair of mounting blocks 82 which are secured to the legs 72 by U-shaped bolts 84. In order to rigidify the assembly, the blocks 82 may underlie a transverse plate 86 which extends between the legs 72.

Rigidly secured to the transverse bar 80 is a pair of spaced parallel, longitudinally extending bars 88. The bars 88 terminate at their forward end in an elongated horizontally disposed splice plate 90 which underlies the joint of the tow bar 30 and the tow pole 70.

Referring now to Figure 6 in particular, it will be seen that the rear portion of the bar 30 is provided with a transversely disposed roller 92 which is carried at the underside of the web 58 by a bracket 94 secured thereto. The roller 92 rests upon the plate 90 and is supported thereby.

As is best illustrated in Figure 7, the forward portion of the plate 90 is provided with an arcuate slot 96. The arcuate slot 96 has passed therethrough a vertically extending rectangular cross sectional bar 98. Extending transversely of the bar 98 and carried thereby beneath the plate 90 is an axle 100 which carries rollers 102 disposed on opposite sides of the bar 98. It will be noted that the axle 100 is longitudinally disposed and that the rollers 102 are disposed transversely of the plate 90.

The bar 98 is seated in a rectangular cross sectional opening 104 in the web 58 of the bar 30 for vertical sliding movement only. Circling the upper portion of the bar 98 is a coil spring 106 whose lower end rests upon the web 58. Compressively engaging the upper end of the coil spring 104 is a plate portion 108 of an adjusting sleeve 110. The adjusting sleeve 110 is internally threaded as at 112 and is threadedly engaged over an externally threaded upper portion 14 of the bar 98. In order that the spring 106 may be conveniently adjusted the sleeve 10 may be provided with a crank 116 if so desired.

Through the use of the adjusting sleeve 110 and the bar 98, the trailer 12 may be properly adjusted with respect to the towing vehicle 10. Further, inasmuch as the bar 98 is provided with the coil spring 106, any road shock will be transmitted to the coil spring 106 and movement of the plate 90 relative to the bar 30 will be permitted to temporarily take the load off of the hitch assembly 14.

It is to be understood that the connection between the tow pole 70 and the tow member 18 is such that the tow member 18 substantially forms a rigid extension of the tow pole 70 in order that not only all of the longitudinal forces but also a major portion of the vertical forces are imposed on the pivot pins 26 and applied directly to the rear axle housing 16. Although a slight pivoting of the tow member 18 relative to the tow pole 70 is permitted by the spring 106 to compensate for road shock, the rigidity of the hitch is not materially affected. Only in case of extreme differential of heights between the rear axle housing 16 and the tow pole 70 are vertical forces applied to the frame of the towing vehicle 10 through the fastening means 36.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. For use in combination with a towing vehicle of the type including a rear axle and a rear cross frame member, a hitch device, said hitch device including a tow member having spaced forward ends, fasteners carried by said forward ends for pivotally attaching said tow member to a rear axle housing, a hitch element carried by the rear end of said tow member and fastening means carried by said tow member intermediate its forward and rear end for slidably connecting said tow member to the rear cross frame member of the towing vehicle, said fastening means comprising a C-shape member secured to said cross frame member and an F-shape member secured to said tow member, the flanges of said C and F shape members being juxtaposed and interacting, a flange of said F-shape member having a longitudinally disposed slot and a flange of said C-shape member having a pin for sliding engagement with said slot and preventing transverse movement of said members relative to each other.

2. For use in combination with a towing vehicle of the type including a rear axle and a rear cross frame member, a hitch device, said hitch device including a tow member having spaced forward ends, fasteners carried by said forward ends for pivotally attaching said tow member to a rear axle housing, a hitch element carried by a rear end of said tow member, fastening means carried by said tow member intermediate its forward and rear end for slidably connecting said tow member to a rear cross frame member, said fastening means including first and second vertically spaced interlocked brackets, said first bracket being securable to a cross frame member, said second bracket being rigidly carried by said tow member, said first and second brackets being vertically and longitudinally movable relative to each other.

3. For use in combination with a towing vehicle of the type including a rear axle and a rear cross frame member, a hitch device, said hitch device including a tow member having spaced forward ends, fasteners carried by said forward ends for pivotally attaching said tow member to a rear axle housing, a hitch element carried by a rear end of said tow member, fastening means carried by said tow member intermediate its forward and rear end for slidably connecting said tow member to a rear cross frame member, said fastening means including first and second vertically spaced interlocked brackets, said first bracket being securable to a cross frame member, said second bracket being rigidly carried by said tow member, said first and second brackets being vertically and longitudinally movable relative to each other, a pin carried by one of said brackets, a longitudinal slot in the other of said brackets, said pin being seated in said slot and preventing transverse movement of said brackets relative to each other.

4. For use in combination with a towing vehicle of the type including a rear axle and a rear cross frame member, a hitch device, said hitch device including a tow member having spaced forward ends, fasteners carried by said forward ends for pivotally attaching said tow member to a rear axle housing, a hitch element carried by a rear end of said tow member, fastening means carried by said tow member intermediate its forward and rear end for slidably connecting said tow member to a rear cross frame member, said fastening means including first and second vertically interlocked brackets, said first bracket being securable to a cross frame member, said second bracket being rigidly carried by said tow member, said first and second brackets being longitudinally movable relative to each other, said first bracket being C-shaped and including an upper flange and a lower flange, said upper flange being attachable to a rear cross frame member, said second bracket being F-shaped including a stem and a pair of vertically spaced flanges, a lower end of said stem being rigidly secured to said tow member, said lower flange being disposed between said vertically spaced flanges.

5. For use in combination with a towing vehicle of the type including a rear axle and a rear cross frame member, a hitch device, said hitch device including a tow member having spaced forward ends, fasteners carrier by said forward ends for pivotally attaching said tow member to a rear axle housing, a hitch element carried by a rear end of said tow member, fastening means carried by said tow member intermediate its forward and rear end for slidably connecting said tow member to a rear cross frame member, said fastening means including first and second vertically interlocked brackets, said first bracket being securable to a cross frame member, said second bracket being rigidly carried by said tow member, said first and second brackets being longitudinally movable relative to each other, said first bracket being C-shaped and including an upper flange and a lower flange, said upper flange being attachable to a rear cross frame member, said second bracket being F-shaped including a stem and a pair of vertically spaced flanges, a lower end of said stem being rigidly secured to said tow member, said lower flange being disposed between said vertically spaced flanges, an upstanding pin carried by said lower flange, a longitudinal slot in the uppermost of said vertically spaced flanges, said pin being seated in said slot and preventing transverse movement of said brackets relative to each other.

6. In a trailer hitch the combination with a towbar for a towing vehicle and a towpole of a trailer having ball and socket connections of a splice plate extending from the trailer below and beyond said towpole to underlie the towbar a substantial distance, a roller attached to the underside of the towbar resting upon said splice plate, said splice plate having an arcuate slot and a shaft extending through said slot, a roller mounted on the end of said shaft and spring means for maintaining yielding contact of said last-named roller with the underside of said splice plate.

7. In a trailer hitch the combination with a towbar for a towing vehicle and a towpole of a trailer having ball and socket connections of a splice plate extending from the trailer below and beyond said towpole to underlie the towbar a substantial distance, a roller attached to the underside of the towbar resting upon said splice plate, said splice plate having an arcuate slot and a shaft extending through said slot, a roller mounted on the end of said shaft and spring means for maintaining yielding contact of said last-named roller with the underside of said splice plate, said spring means being adjustable to adjust the trailer with respect to the towing vehicle and to absorb road shock.

References Cited in the file of this patent
UNITED STATES PATENTS

| | | |
|---|---|---|
| 1,342,507 | McNamara | June 8, 1920 |
| 2,056,523 | Jacob | Oct. 6, 1936 |
| 2,091,668 | Bradford | Aug. 31, 1937 |
| 2,320,046 | Notar | May 25, 1943 |
| 2,329,380 | Arehart | Sept. 14, 1943 |
| 2,453,941 | Smit | Nov. 16, 1948 |
| 2,459,965 | Robertson | Jan. 25, 1949 |
| 2,517,047 | Spitler | Aug. 1, 1950 |
| 2,643,891 | Mosely | June 30, 1953 |
| 2,680,626 | Hedgepeth | June 8, 1954 |
| 2,711,908 | Saxon | June 28, 1955 |